United States Patent [19]

Suzuki

[11] Patent Number: 5,734,320
[45] Date of Patent: Mar. 31, 1998

[54] EMERGENCY WARNING GEAR HAVING A MULTITUDE OF FUNCTIONS

[75] Inventor: Toshihiro Suzuki, Osaka, Japan

[73] Assignee: Kabushiki Kaisha T G E (T G E Corporation), Osaka-fu, Japan

[21] Appl. No.: 498,961

[22] Filed: Jul. 6, 1995

[30] Foreign Application Priority Data

Jul. 13, 1994 [JP] Japan .................. 6-161496

[51] Int. Cl.⁶ .................................................. B60Q 7/00
[52] U.S. Cl. ................................. 340/473; 455/89; 362/35
[58] Field of Search .......................... 340/473, 474, 340/482; 362/35; 455/89

[56] References Cited

U.S. PATENT DOCUMENTS

| | | | |
|---|---|---|---|
| 3,789,358 | 1/1974 | Ellis | 340/473 |
| 4,034,164 | 7/1977 | Westmoland | 455/89 X |
| 4,057,757 | 11/1977 | Darden | 455/89 |
| 4,489,306 | 12/1984 | Scolari | 340/473 |
| 5,448,765 | 9/1995 | Kovanen | 455/89 |
| 5,490,046 | 2/1996 | Gohl | 362/35 |

*Primary Examiner*—Jeffery Hofsass
*Assistant Examiner*—Anh La
*Attorney, Agent, or Firm*—Jordan and Hamburg

[57] ABSTRACT

An emergency warning gear includes: a casing; a turning light device and a flash light device provided on an outside of the casing; a loudspeaker provided in an inner space of the casing; a microphone connectable with the loudspeaker; a radio device; and an attaching device which removably attaches the casing on a roof panel of a vehicle.

12 Claims, 7 Drawing Sheets

EMERGENCY WARNING GEAR HAVING A MULTITUDE OF FUNCTIONS

BACKGROUND OF THE INVENTION

This invention relates to an emergency warning gear, particularly to an emergency warning gear which has a multitude of functions and is detachably mountable on emergency or security vehicles.

Conventionally, an emergency vehicle such as ambulance and patrol car is provided on a roof panel thereof with a warning light in the form of a turning light and a loudspeaker for producing siren sounds or reproducing voice sounds in accordance with electric signals from a microphone. An operation switch to turn on and off the warning light and the microphone connected with the loudspeaker are arranged in a dashboard provided inside the vehicle. Japanese Examined Utility Model Publication No. 4-9686 shows an example of such conventional warning devices.

A conventional warning device is fixedly attached to a roof panel of an emergency vehicle lest it fall off from the roof panel during running. For this reason, the roof panel of an emergency vehicle is formed in advance with a mounting portion for mounting a warning device. However, ordinarily vehicles other than emergency vehicles are not formed with a mounting portion for a warning device. Accordingly, a warning device cannot be mounted on a roof panel of such a vehicle.

Also, a conventional warning device is fixedly attached to a roof panel of an emergency vehicle, and cannot be basically separated from the roof panel. An emergency vehicle is required to be loaded, in addition to the warning light and loudspeaker fixedly attached to the roof panel, with a portable loudspeaker and a portable warning light which are necessary at an accident location and other many emergency devices. However, the loading space of an emergency vehicle is limited. Accordingly, there has been the demand of combining some emergency devices having similar functions into a single device to provide the limited space for other necessary devices.

Further, an emergency vehicle is usually required to be provided with a radio device to enable distant communication in addition to such warning devices. A radio device occupies a considerably large space and it is also cumbersome to install a radio device at a suitable position in a limited inner space of the vehicle.

SUMMARY OF THE INVENTION

It is an object of the present invention to provide an emergency warning gear which has overcome the problems residing in the prior art.

It is another object of the present invention to provide an emergency warning gear which is capable of performing a multitude of functions in a simple construction.

The present invention is directed to an emergency warning gear comprising: a casing having an inner space; a warning light provided on an outside of the casing; a loudspeaker provided in the inner space of the casing; a microphone connectable with the loudspeaker; and an attaching device which removably attaches the casing on a roof panel of a vehicle.

It may be appreciated to further provide a radio device in the casing.

A magnet may be attached to an outside of the casing as the attaching device. Also, it may be appreciated to provide a fastener having one end connectable with the casing and the other end connectable with an appropriate portion of the vehicle for fastening the casing onto the vehicle.

The casing may be provided with a power supply device for supplying an electric current to the warning light and the loudspeaker which is electrically connected with a battery provided in the vehicle by a connection member, or with a portable battery by a connection member.

The casing may be further formed with a hollow portion defining a horn portion for the loudspeaker. At a front of the horn portion, further, a sound wave directing member is removably provided to direct sound waves in a predetermined direction.

The warning light may be constructed by a turning light device whose emission direction is able to turn about an axis of the turning light device; and a flash light device which emits flash light. Further, it may be preferable to provide a flash firing controller which controls the flash light device to fire when the emission direction of the turning light device is in opposite to the flash light device.

Further, it may be appreciated to provide a backpack for holding the casing in a state that the warning light is exposed to outside.

With these emergency warning gears, the casing is attached on a roof panel of a vehicle, thereby, the warning light and the loudspeaker can be attached on the roof panel easily. Accordingly, an ordinary vehicle having no special mounting portion can be changed to an emergency vehicle easily. For emergencies of car accident, railway accident, airplane crash accident, crime occurrence, national or international big event, etc. prompt performances can be done.

Also, the casing is removed or detached from the roof panel easily. Accordingly, at an accident field, e.g., in earthquake disaster or in a mountain, a rescue officer who has arrived at the location by an emergency vehicle attached with the casing provided with the warning light and the loudspeaker can detach the casing from the vehicle easily and then carry it together with him by his hand or on his shoulder to an accident spot where he can use the warning light and the loudspeaker effectively.

Also, the radio device is additionally provided in the casing. It is not necessary to provide a radio device in a limited inner space of the vehicle, which will consequently provide a space for other necessary items. Also, the radio device provided in the casing can be efficiently used not only with the vehicle but also at a spot away from the vehicle.

The casing is attached with a magnet on an outside thereof. Accordingly, the attachment and detachment of the casing onto and from a roof panel of a vehicle can be accomplished easily. Also, the casing carrying the warning light and the loudspeaker can be reliably attached on a roof panel of a vehicle.

The casing carrying the warning light and the loudspeaker is attached by the means of a fastener having one end connectable with the casing and the other end connectable with the vehicle. This will eliminate the likelihood that the casing inadvertently falls off from the roof panel due to an abrupt motion of the vehicle, e.g., crash, and then causes a secondary accident, without impairing the portability of the casing.

The casing is provided with the power supply device, which is electrically connected with a battery provided in the vehicle by a connection member, or with a portable battery by a connection member. Accordingly, when this emergency warning gear is carried with a vehicle, the battery mounted on the vehicle can be used. On the other hand, when the emergency warning gear is carried by a hand or on shoulder, the portable battery can be used as a power source.

The sound wave directing member is removably provided at a front of the horn portion to direct sound waves in a predetermined direction. Accordingly, when sound waves are required to be transmitted to a wide range, the sound wave directing member is removed from the casing 3 to ensure wide range transmission. When sound waves are required to be transmitted in a specified direction, the sound wave directing member is placed at the front of the horn portion to allow sound waves to transmit in the specified direction.

The warning light includes the turning light device and the flash light device. Further, the flash firing controller is provided to control the flash light device to fire when the emission direction of the turning light device is in opposite to the flash light device. Turning light and flash light which are emitted by these devices will give an enhanced warning effect to people. Also, the flash firing controller prevents flash light from being diluted by turning light, and assures distinctive illumination of flash light.

There is provided the backpack for holding the casing in a state that the warning light is exposed to outside. Accordingly, when a long walking is required in such a case as mountain accident, the casing provided with the warning light and the loudspeaker can be carried easily, which consequently assures efficient rescue operations.

These and other objects, features and advantages of the invention will become more apparent upon a reading of the following detailed disclosure of the preferred embodiments with reference to the appended drawings.

DETAILED DESCRIPTION OF THE PREFERRED EMBODIMENTS OF THE PRESENT INVENTION

Figure 1:
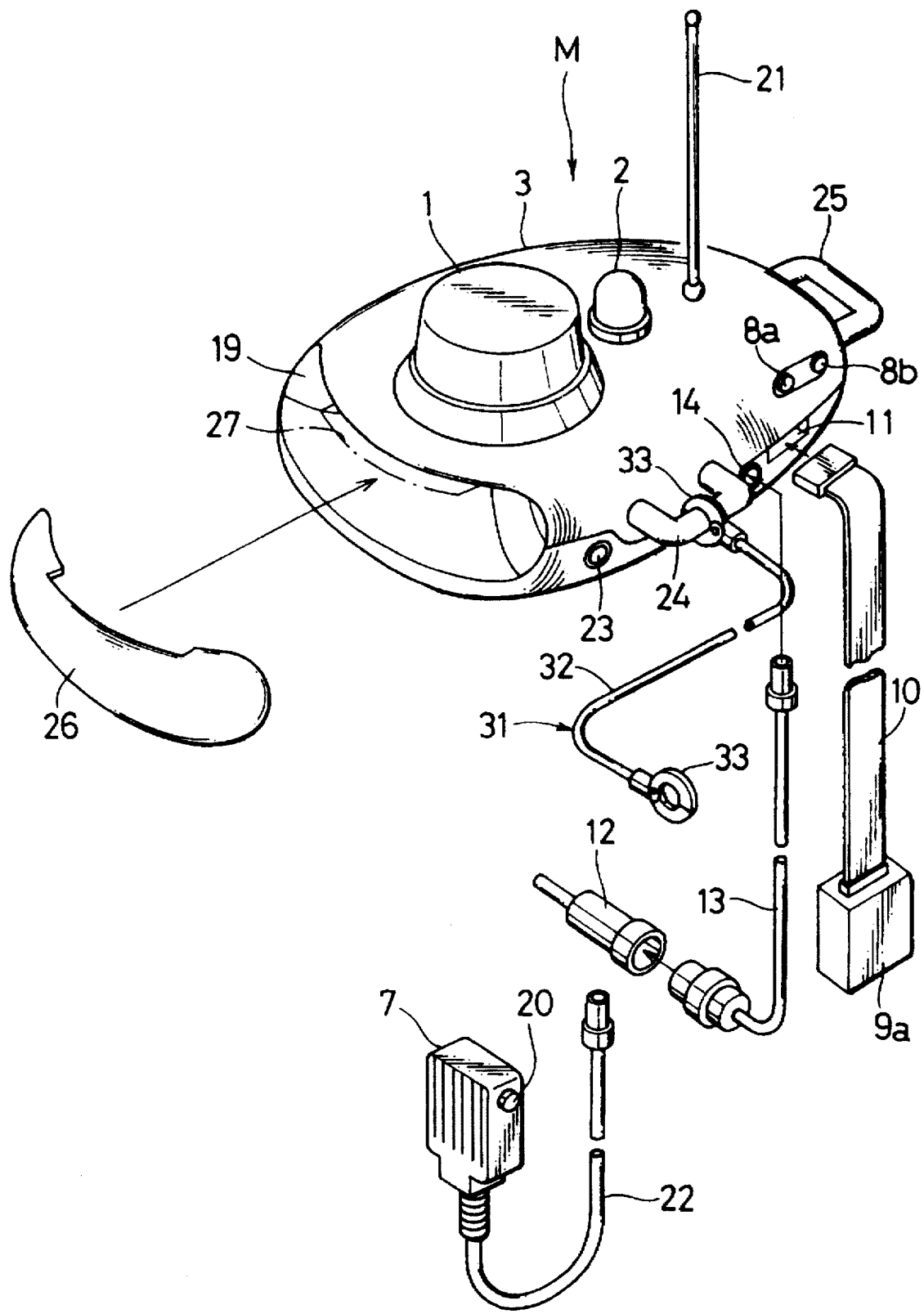
FIG. 1 is an exploded perspective view showing an emergency warning gear having a multitude of functions embodying the invention.
Figure 2:
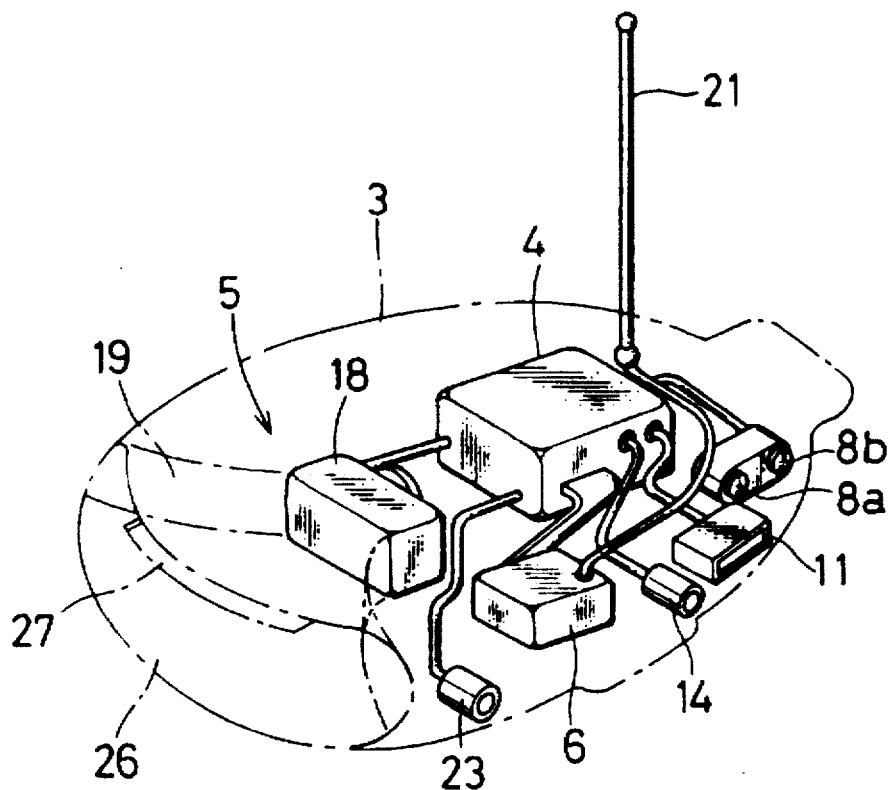
FIG. 2 is a perspective view showing an interior arrangement of a main body of the multifunctional emergency warning gear.
Figure 4:
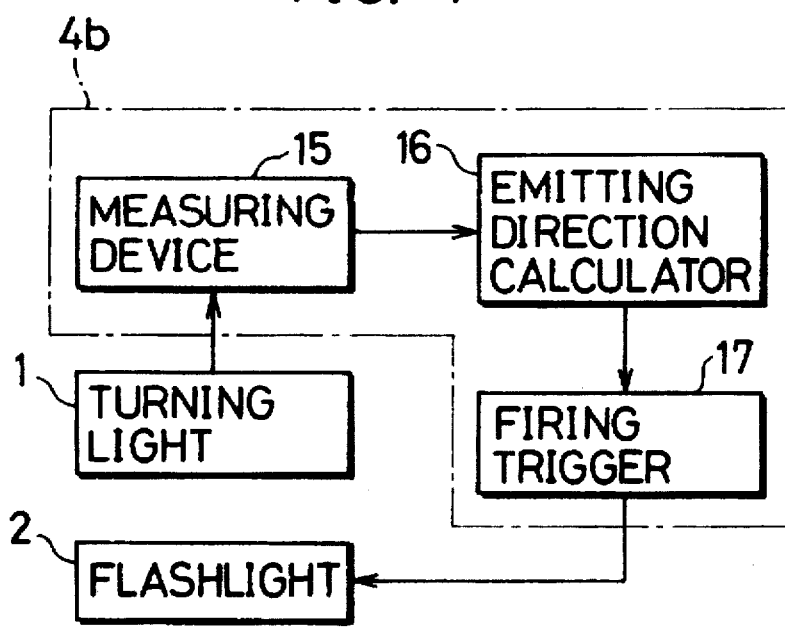
FIG. 4 is a block diagram showing a control system of the multifunctional emergency warning gear.
Figure 3:
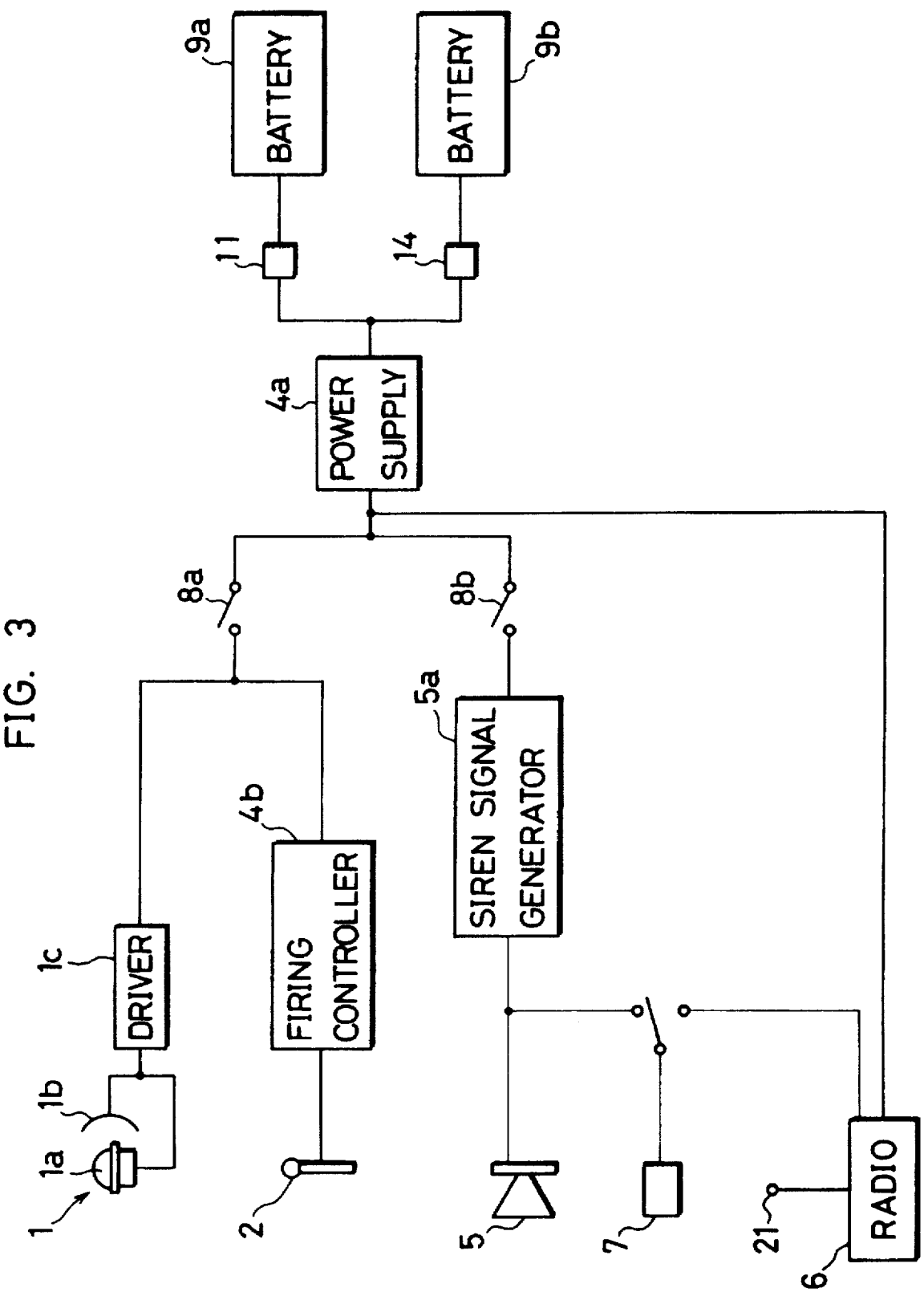
FIG. 3 is a circuit diagram showing an overall electrical connection of the multifunctional emergency warning gear.

FIGS. 1 to 4 are diagrams showing an emergency warning gear having a multitude of functions embodying the present invention. The multifunctional emergency warning gear comprises a main body M, a microphone 7, a portable battery 9a, a connecting belt 10, a battery connecting cord 13, and a fastener 31.

The main body M comprises a warning light including a turning light device 1 and a flash light device 2, a casing 3 including an upper member and a lower member, an electric control circuit 4 internally provided within the casing 3, a loudspeaker 5, and a radio device 6.

The electric control circuit 4 includes a first jack 11, a second jack 14, a power supply device 4a, a siren generator 5a, a flash firing controller 4b, and switches 8a and 8b.

The connecting belt 10 is adapted for the portable battery 9a, and is connected with the portable battery 9a at one end and connected with the first jack 11 at the other end. The connecting cord 13 is connected with the second jack 14 at one end thereof. The other end of the connecting cord 13 is connected with an outlet port of the battery 9b mounted on the vehicle, e.g., a cigarette lighter. A source electric current is supplied to the power supply device 4a, and adjusted in the power supply device 4a to supply an adjusted electric current to the turning light device 1, the flash light device 2, the siren generator 5a, and other parts.

The turning light device 1 is arranged at a front position of the upper casing member. The flash light device 2 is arranged at a rear position of the upper casing member. The turning light device 1 includes a color light emitter 1a, e.g., red light, orange light, purple light, or other color light, a reflector 1b which is rotated about the color light emitter 1a, and a driver 1c for driving the color light emitter 1a and the reflector 1b.

The switches 8a and 8b are provided on a right side of the casing 3. When the switch 8a is turned on, an adjusted electric current is supplied to the driver 1c of the turning light device 1 from the power supply device 4a connected with the portable battery 9a or the battery 9b mounted on an unillustrated vehicle to drive the color light emitter 1a and the reflector 1b. The reflector 1b rotates about the color light emitter 1a to change the emission direction of the color light emitter 1a.

The flash light device 2 is driven by an adjusted electric current from the power supply device 4a to emit light in flashes. The firing of the flash light device 2 is controlled to be in synchronism with the rotation of the reflector 1b of the turning light device 1. Specifically, the flash firing controller 4b includes a measuring device 15 near the reflector 1b of the turning light device 1, an emitting direction calculator 16, and a firing trigger 17.

The measuring device 15 includes a rotary encoder for measuring a turning angle of the reflector 1b of the turning light device 1. The emitting direction calculator 16 calculates an emitting direction of the turning light device 1 based on an output of the measuring device 15. The firing trigger 17 is in responsive to the emitting direction calculator 16, and sends a firing signal to the flash light device 2 to emit light in a flash when the emitting direction calculator 16 calculates that the emitting direction of the turning light device 1 is opposite to the flash light device 2.

As mentioned above, the flash light device 2 is fired by the firing trigger 17 connected with the emitting direction calculator 16. However, it may be appreciated to provide a mechanical firing trigger in place of the above-mentioned electrical firing trigger 17. Specifically, the flash firing controller 4b is provided with a mechanical member connected with the reflector 1b of the turning light device 1 to fire the flash light device 2 in accordance with a movement of the mechanical member.

The loudspeaker 5 is connected with the siren generator 5a which is provided in the electric control circuit 4. The siren generator 5a is connected with the power supply device 4a via the switch 8b. Siren sounds are generated in the loudspeaker 5 by the siren generator 5a when the switch 8b is turned on.

The loudspeaker 5 is provided with an acoustic transducer 18 and a horn portion 19. The acoustic transducer 18 is adapted for converting an electrical sound signal from the microphone 7 to sound waves. The horn portion 19 is integrally formed with the casing 3 and includes a hollow portion having a fan-like shape and extending wider as approaching forward so that the sound waves produced by the acoustic transducer 18 advance to the front.

The microphone 7 converts vocal sounds to an electric signal and sends it to the loudspeaker 5 and the radio device 6. The microphone 7 is provided with a selection switch 20 which enables an electrical sound signal to be selectively sent to the loudspeaker 5 or the radio device 6. In the case where the radio device 6 is selected by the selection switch 20, the electrical sound signal is sent to the radio device 6. Thereafter, the electrical sound signal is converted to a radio signal by the radio device 6 to be transmitted therefrom.

The casing 3 of the main body M has a generally flat box-like shape. The separable upper and lower members of the casing 3 define an inner space to accommodate the electrical control circuit 4, the loudspeaker 5, the radio device 6, and other parts.

The main body M is further attached with an antenna 21 for the radio device 6 on a top of the casing 3 and a third jack 23 at a right side of the casing 3. A connecting cord 22 of the microphone 7 is connected with the third jack 23.

The main body M is further provided with a side handle 24 and a rear handle 25 to be gripped with a hand when carrying the main body M.

Also, a sound wave directing member 26 is detachably attached to a front face of the casing 3 to shield the horn portion 19. The sound wave directing member 26 is attached to the casing 3 with a gap 27 being left between the upper member of the casing 3 and the sound wave directing member 26 to cause the sound waves to advance upward from the casing 3.

Figure 5:
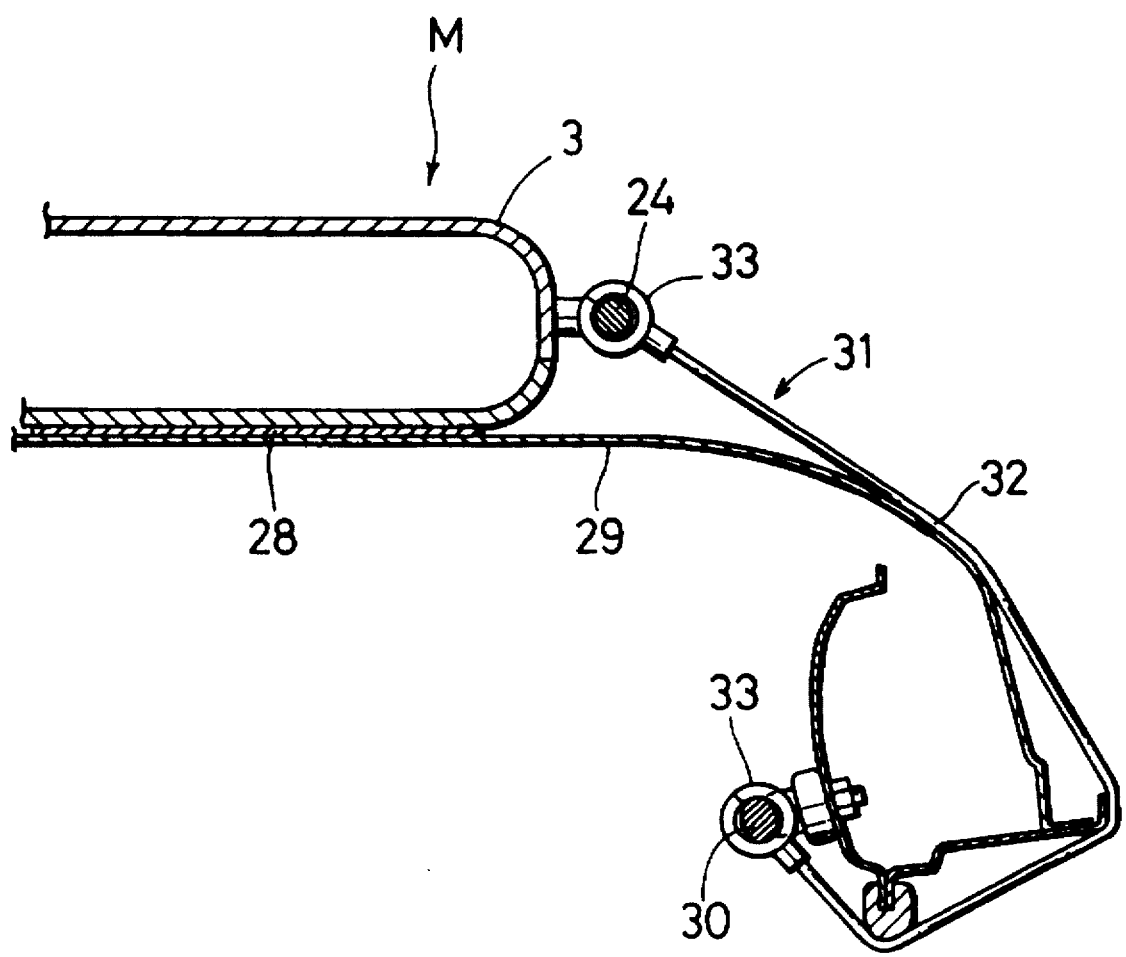
FIG. 5 is a sectional diagram showing a state where the main body is mounted on a roof panel of a vehicle.

As shown in FIG. 5, the casing 3 is fixedly attached with a plate magnet 28 at an underside thereof. The plate magnet 28 is made by mixing ferrite or rare earth cobalt alloy in powder with 10 to 15 percents of plastic material as bonding agent, and extruding the mixed raw material into a plate.

In the multifunctional emergency warning gear, there is further provided a fastener 31 for fastening the main body M to a roof panel of a vehicle. The fastener 31 includes a steel wire 32 and hooks 33 attached to both ends of the wire 32. One hook 32 is removably caught on the handle 24 of the casing 3 while the other hook 32 is removably caught on an assist grip 30 provided on a frame of the vehicle.

The main body M is attached on the roof panel 29 of the vehicle by a magnetic force of the plate magnet 28, and the tension of the fastener 31. In this state, the horn portion 19 of the loudspeaker 5 is directed forward.

Next, one end of the connecting cord 13 is inserted in the second jack 14 and the other end is inserted in the outlet port of the battery 9b mounted on the vehicle to supply a source electric current to the power supply device 4a from the battery 9b mounted on the vehicle to drive the turning light device 1, the flash light device 2, and the loudspeaker 5 which are internally provided in the casing 3.

Further, the terminal end of the connecting line 22 of the microphone 7 is inserted in the third jack 23 of the main body M.

In this way, the turning light device 1, the flash light device 2, the loudspeaker 5, and the radio device 6 are provided on the roof panel 29 of the vehicle while the microphone 7 is provided in the vehicle to enable a driver to use the loudspeaker 5 and the radio device 6. Consequently, an emergency vehicle is completed with ease.

The turning light device 1, the flash light device 2, the loudspeaker 5, and the radio device 6, which are necessary for emergency, are reliably attached on the roof panel 29 of the vehicle merely by placing the main body M provided with the plate magnet 28 on the roof panel 29 and catching the hooks 33 of the fastener 31 on the handle 24 of the casing 3 and on the assist grip 30. Accordingly, it is not necessary to specially form in a roof panel of a vehicle a mounting portion for mounting a turning light device, flash light device, loudspeaker, and radio device. Accordingly, an ordinary vehicle can be easily changed into an emergency vehicle.

At a location of car accident, railway accident, airplane crash accident, crime occurrence, national or international big event, for example, a vehicle is easily attached with the main body M, and an officer can promptly give warning notice to people at the location by the turning light device 1, the flash light device 2, and the loudspeaker 5 arranged on the roof panel 29 of the vehicle. Also, an officer at an accident location can contact a remote headquarter via the radio device 6 arranged in the main body M and the microphone 7.

Moreover, the main body M carrying the turning light device 1, flash light device 2, loudspeaker 5, and radio device 6 can be easily detached from the roof panel 29 of the vehicle. Accordingly, at a location of earthquake disaster or accident in a mountain, a rescue officer who has arrived at the location by an emergency vehicle attached with the main body M can detach the main body M from the vehicle easily and then carry it together with him by his hand or on his shoulder to an accident spot where he can in turn perform an efficient rescuing operation using it.

The main body M is provided with the radio device 6. Accordingly, it is not necessary to provide a radio device in a limited inner space of the vehicle, which will consequently provide a space for other necessary items. Also, the radio device 6 provided in the main body M can be used not only in the vehicle attached with the main body M but also at a spot away from the vehicle.

Alternatively, it may be appreciated not to provide the radio device 6 in the main body M but at an appropriate portion in an inner space of the vehicle. In this case, an antenna 21 is attached on the casing 3 and is connected with the radio device 6 provided in the inner space of the vehicle by way of a connection wire.

In the foregoing embodiment, a sound signal from the microphone 7 is selectively transmitted to the loudspeaker 5 and the radio device 6 in accordance with an operation of the selection switch 20. However, it may be appreciated to provide a microphone for the loudspeaker 5 and a microphone for the radio device 6 separately.

The main body M is magnetically attached to the upper surface of the roof panel 29 of the vehicle by the plate magnet 28 which is fixedly attached on the bottom of the casing 3. Accordingly, the attachment and detachment of the main body M to and from the roof panel 29 can be executed easily, and the main body M can be attached to the roof panel 29 in a reliable state.

Further, the main body M is fastened to the vehicle by the fastener 31 hooked with the side handle 24 of the casing 3 at one end thereof and hooked with the assist grip 30 of the vehicle at the other end thereof. Accordingly, the main body M can be reliably prevented from inadvertently falling off from the roof panel 29 owing to an abrupt motion of the vehicle, e.g., crash, without impairing the portability of the main body M.

In the foregoing embodiment, the main body M is fastened to the vehicle by the fastener 31 connected with one side of the main body M. However, it may be appreciated to provide two fasteners 31 for both sides of the main body M, and fasten the main body M to the vehicle at the both sides.

As power supply lines for the main body M, there are provided the connecting belt 10 connected with the portable battery 9a and the connecting cord 13 connectable with the battery 9b mounted on the vehicle. Accordingly, when the main body M is carried by a hand or on shoulder of people, the portable battery 9a can be used as a power source of the main body M. When the main body M is attached to the vehicle, on the other hand, the battery 9b mounted on the vehicle can be used as a power source of the main body M to save the portable battery 9a.

In the foregoing embodiment, the connecting belt 10 and the connecting cord 13 are separately provided. It may be appreciated to provide a single power supply member connectable with both the portable battery 9a and the battery 9b mounted on the vehicle.

The casing 3 of the main body M is formed with the fan-like hollow portion defining the horn portion 19 of the loudspeaker 5. Also, at the front of the horn portion 19 is placed the sound wave directing member 26. However, when the main body M is fastened on the roof panel 29 of the vehicle, it may be possible to remove the sound wave directing member 26 from the casing 3 to transmit sound waves generated by the acoustic transducer 18 of the loudspeaker 5 to a wider range.

Also, the sound wave directing member 26 is placed at the front of the horn portion 19 to enclose the front of the horn portion 19 and render sound waves develop from a top of the casing 3. Accordingly, in the case where the main body M is carried by a hand or on shoulder of people, sound waves from the loudspeaker 5 can be effectively transmitted in a desired direction, e.g., in a forward direction to transmit sound waves to a farther area in mountains while keeping sound waves from going to the ground and diminishing. It should be noted that sound waves are not required to develop from a top of the casing 3, but may be made to develop from a side of the casing 3 or from other portions.

The warning light of the turning light device 1 and the flash light device 2 is arranged at the top of the casing 3. The electrical control circuit 4 controls the flash light device 2 to turn on each time the turning light device 1 illuminates to the forward of the casing 3, i.e., the opposite direction to the flash light device 2. Accordingly, a flash of the flash light device 2 is not overlighted by the turning light device 1, and can be separately seen from a distant location.

Figure 6:
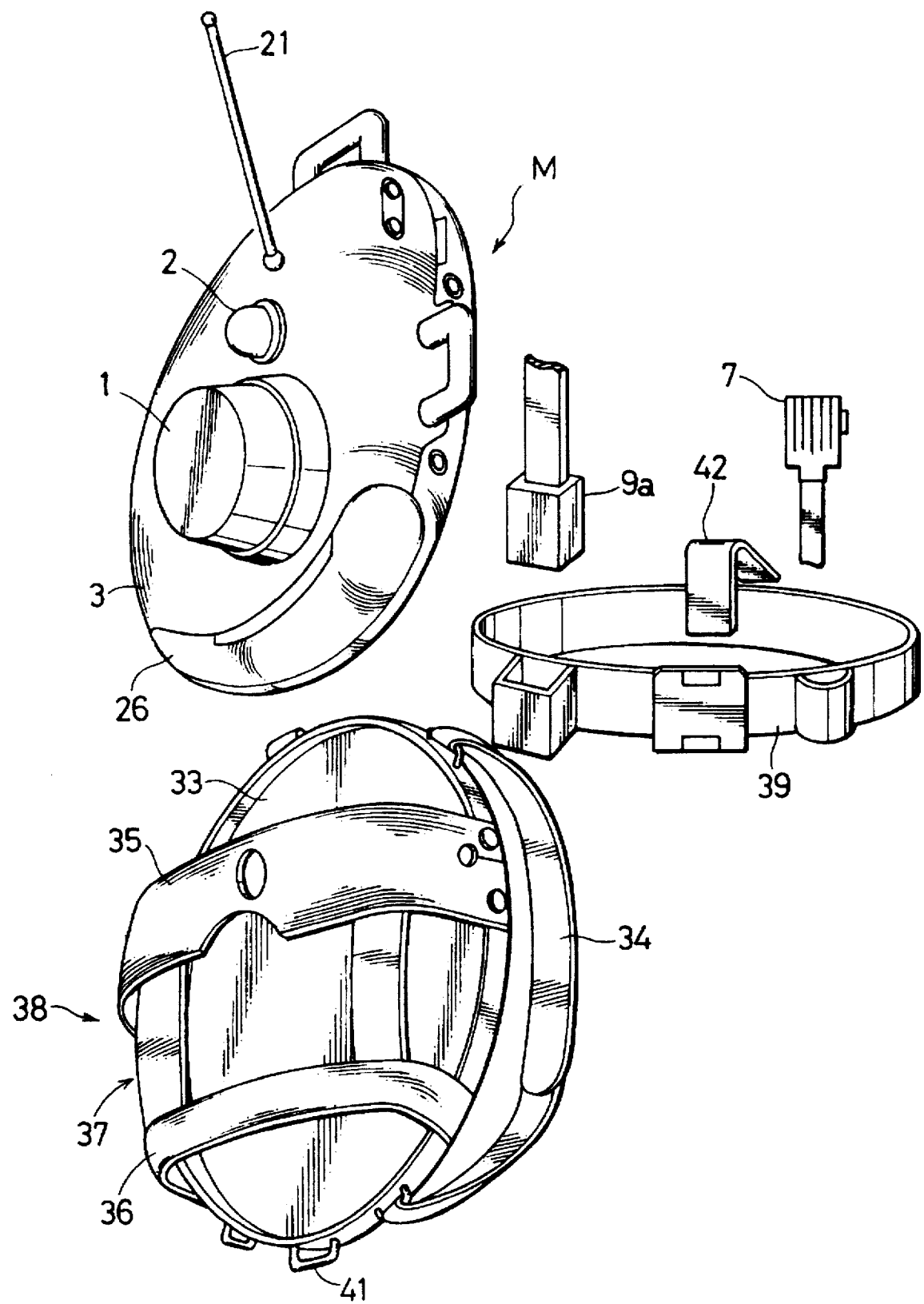
FIG. 6 is an exploded perspective view showing a backpack and a waist belt which are components of the multifunctional emergency warning gear, the backpack being adapted for holding the main body, the waist belt being adapted for holding a microphone and a battery, the backpack and waist belt being separated from each other.

The multifunctional emergency warning gear, as shown in FIG. 6, further comprises a backpack 38 for carrying the main body M on a back of people, e.g., a back of a rescue officer. The backpack 38 includes a base member 33, shoulder belts 34, and a holder portion 37 having a holding strap 35 and a supporting strap 36. The base member 33 has a general shape corresponding to the shape of the lower member of the casing 3. Ends of the shoulder belt 34 are connected to a rim of a back side of the base member 33. The holding and supporting straps 35 and 36 are arranged on a front side of the base member 33 for holding and supporting the main body M.

The main body M is held on the backpack 38 in a state that the turning light device 1 and the flash light device 2 are directed outside. The backpack 38 held with the main body M is carried on a back of people by the shoulder belts 34. The carriage of the main body M with the backpack 38 will be useful for an operation of search for the missing at a mountain accident.

Further, the multifunctional emergency warning gear is provided with a waist belt 39 having a microphone holder and battery holder. The waist belt 39 enables holding of the portable battery 9a in the battery holder and holding of the microphone 7 in the microphone holder when not in use and then free hands which are very advantageous for rescue operations.

To make it easier to put the main body M in and out from the backpack 38, it may be preferable that at least one end of the holding and supporting straps 35 and 36 is separably connected to the base member 33 by means of a tape fastener, e.g., a Velcro fastener and a hook.

Figure 7:
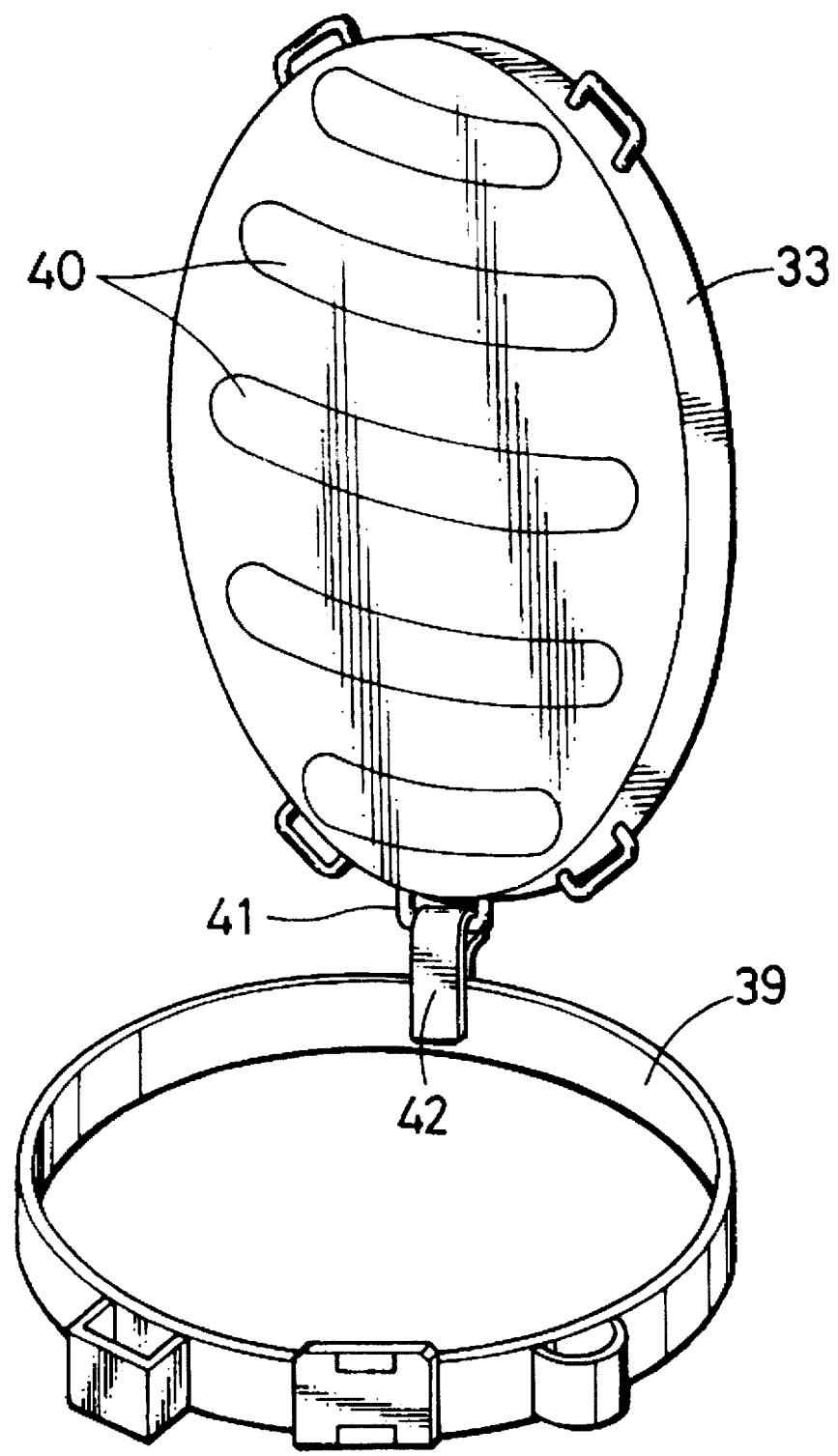
FIG. 7 is a perspective view showing the backpack and the waist belt coupled with each other.

As shown in FIG. 7, it may be preferable that the base member 33 is provided with shock absorbers 40 made of foam resin at the back side thereof. Also, it may be appreciated to provide the base member 33 with a U-shaped connection ring 41 at a lower end thereof and the waist belt 39 is attached with a connection strip 42 at a rear portion thereof, whereby the backpack 38 is connected with the waist belt 39 by passing one end of the connection strip 42 through the connection ring 41 and fastening the one end on the waist belt 39. In this way, the backpack 38 is tightly connected with the waist belt 39, thereby the main body M is reliably prevented from moving up and down in the backpack 38 during walking.

Figure 8:
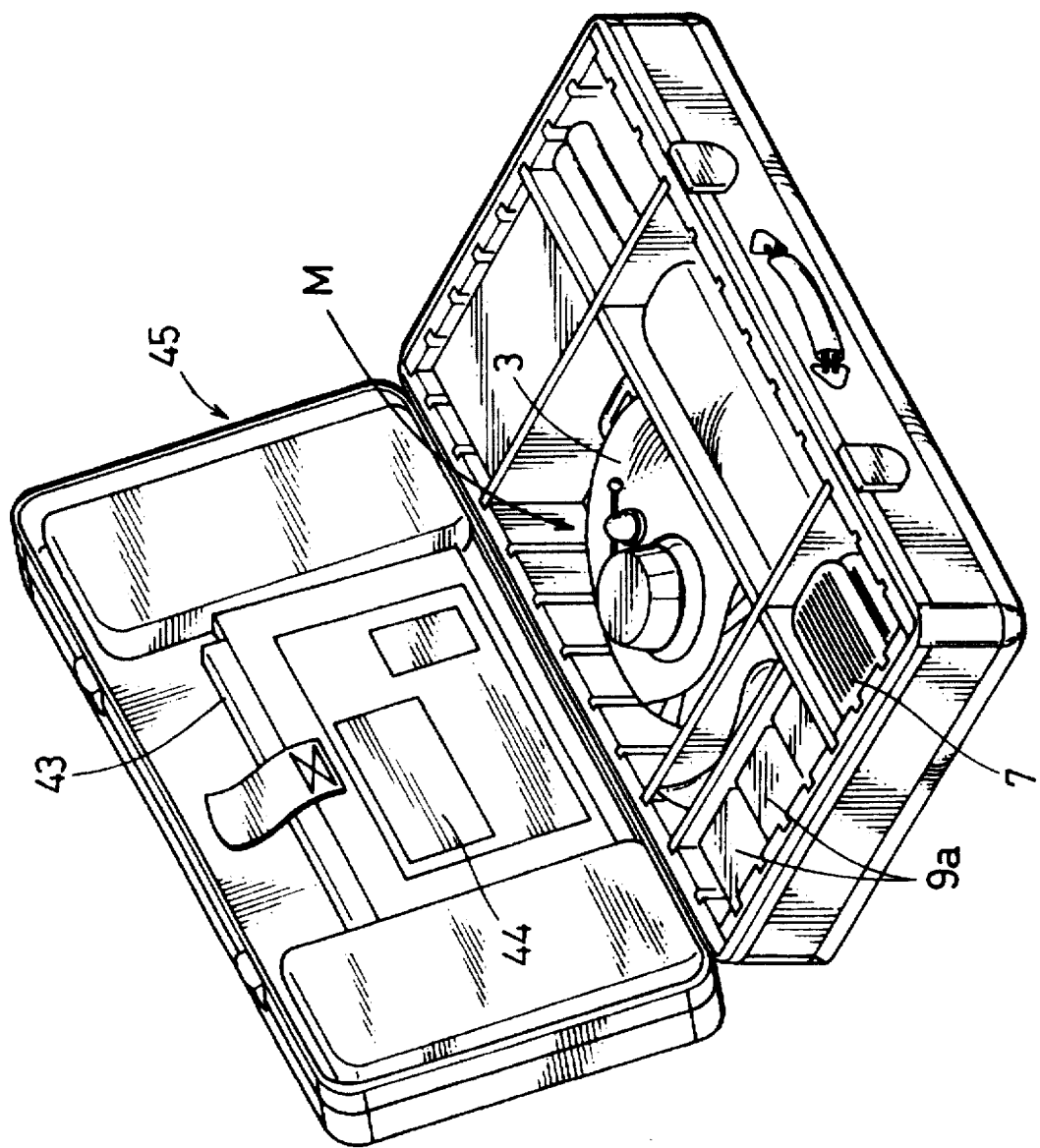
FIG. 8 is a perspective view showing a carriage case, which is another component of the multifunctional emergency warning gear, for holding the main body, the microphone, and the battery.

Further, the multifunctional emergency warning gear, as shown in FIG. 8, is provided with a carriage case 45. The carriage case 45 includes a number of sections for holding the main body M, the microphone 7, the portable battery 9a, document files 43, and the like. Also, a maintenance recording sheet 44 may be attached on an appropriate portion.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An emergency warning gear for use with an emergency or security vehicle comprising:
    a rigid and non-collapsible casing having an inner space;
    a warning light provided on an outside of the casing:
        a loudspeaker provided in the inner space of the casing;
        the casing further including a hollow portion defining a horn portion for the loudspeaker;
        a microphone connectable with the loudspeaker; and
        an attaching device which removably attaches the casing on a roof panel of a vehicle.

2. An emergency warning gear as defined in claim 1, further comprising a sound wave directing member removably provided at a front of the horn portion for directing sound waves in a predetermined direction.

3. An emergency warning gear comprising:
    a casing having an inner space;
    a warning light provided on an outside of the casing, the warning light including:

a turning light device whose emission direction is able to turn about an axis of the turning light device; and a flashing light device which emits a flashing light; and a flash firing controller which controls the flashing light device to fire when the emission direction of the turning light device is opposite to the flashing light device;

a loudspeaker provided in the inner space of the casing;

a microphone connectable with the loudspeaker; and an attaching device which removably attaches the casing on a roof panel of a vehicle.

4. Emergency warning apparatus comprising a casing having a top facing a first direction and a side portion facing another direction generally normal to said first direction, a loudspeaker in said casing having a hollow horn section opening up to said side portion of said casing such that the sound waves emitted from said hollow horn section are transmitted outwardly of said casing through said hollow horn section, said casing further comprising a sound wave directing member which is mountable on said side portion of said casing in a position covering said hollow horn section, said casing, when said sound wave directing member is mounted on said side portion of said casing, having a sound opening facing generally in said first direction such that the sound waves emitted from said loudspeaker are omitted from said casing through said sound opening generally in said first direction while being precluded from being transmitted from said hollow horn section which opens up to said side of said casing by said sound wave directing member mounted on said side portion of said casing and covering said hollow horn section.

5. Emergency warning apparatus according to claim 4 further comprising first attachment means for attaching said casing to a vehicle such that said top of said casing is generally horizontally disposed, said vehicle being movable in a forward direction such that said side portion of said casing and said hollow horn section face in said forward direction, said sound wave directing member being detached from said casing when said casing is attached to said vehicle by said first attachment means such that the sound waves are emitted from said hollow horn section in a generally forward direction.

6. Emergency warning apparatus according to claim 5 further comprising second attachment mean for attaching said casing to the back of a person such that said top of said casing is generally vertically disposed and said sound opening faces generally rearwardly of said person, said sound directing member being mounted on said casing when said casing is attached to the back of said person by said second attachment means such that the sound waves from said loudspeaker are emitted in a direction generally rearwardly of said person while being precluded from being transmitted from said hollow horn section which opens up to said side portion of said casing by said sound wave directing member mounted on said casing and covering said hollow horn section.

7. Emergency warning apparatus according to claim 4 wherein said top of said casing has a forward edge, said sound wave directing member having an upper portion with a rear edge, said rear edge being spaced from said forward edge to define said sound opening.

8. Emergency warning apparatus according to claim 4 wherein said hollow horn section has a fan-like configuration which includes a small end portion and a large end portion, said large end portion opening up to said side portion of said casing when said sound wave directing member is removed from said casing.

9. Emergency warning apparatus according to claim 4 wherein said hollow horn section has a fan-like configuration which includes a small end portion and a large end portion, said sound wave directing member, when mounted on said casing, covering that part of said large end portion which faces said other direction while retaining open a part of said large end portion which faces said first direction to thereby define said sound opening.

10. Emergency warning apparatus according to claim 4 wherein said hollow horn section is integrally formed with said casing.

11. Emergency warning apparatus according to claim 4 wherein said loudspeaker comprises an acoustic transducer in said casing for converting electrical sound signals from said microphone to sound waves.

12. An emergency warning gear for use on a vehicle comprising:

a casing having an inner space;

a warning light provided on an outside of the casing, the warning light including:

a turning light device whose emission direction is able to turn about an axis of the turning light device; and a flashing light device which emits a flashing light; and a flash firing controller which controls the flashing light device to emit a flash of light when the emission direction of the turning light device is opposite to the flashing light device.

* * * * *